United States Patent [19]

Martin et al.

[11] 4,238,514

[45] Dec. 9, 1980

[54] RICE CEREAL AND PROCESS

[75] Inventors: Thom O. Martin, Delton, Mich.; Adolph S. Clausi, Cos Cob, Conn.

[73] Assignee: General Foods Corporation, White Plains, N.Y.

[21] Appl. No.: 48,968

[22] Filed: Jun. 15, 1979

[51] Int. Cl.³ .............................................. A23L 1/18
[52] U.S. Cl. ....................................... 426/62; 426/93; 426/296; 426/620; 426/621; 426/656; 426/449; 426/462; 426/466
[58] Field of Search .................... 426/62, 89, 93, 289, 426/296, 620, 621, 656, 449, 462, 466

[56] References Cited

U.S. PATENT DOCUMENTS

| | | | |
|---|---|---|---|
| 2,131,450 | 9/1938 | McKay | 426/621 |
| 3,879,566 | 4/1975 | Cox et al. | 426/462 X |
| 3,920,852 | 11/1975 | Haas | 426/656 X |

FOREIGN PATENT DOCUMENTS

| | | | |
|---|---|---|---|
| 6621 | of 1927 | Australia | 426/449 |
| 70592 | 1/1976 | Australia | 426/62 |
| 51-1668 | 1/1976 | Japan | 426/62 |

*Primary Examiner*—Esther M. Kepplinger
*Attorney, Agent, or Firm*—Daniel J. Donovan; Thomas R. Savoie

[57] ABSTRACT

Disclosed is an improvement in a process for preparing a puffed ready-to-eat cereal product from rice. Nato rice typically sticks and clumps during processing. The present invention reduces this problem. In a preferred embodiment, milled rice is admixed with spray dried torula yeast which has been cultured in ethanol, prior to cooking the rice in a sugar solution, and drying, tempering, bumping, puffing and toasting.

9 Claims, No Drawings

RICE CEREAL AND PROCESS

DESCRIPTION

1. Technical Field

Our invention relates ready-to-eat cereal products, and particularly to an improved process for preparing a puffed cereal product from milled rice.

In the the preparation of puffed cereal products from milled Nato rice, it is necessary to first cook the rice in a flavoring solution which usually contains sugars, salt and the like. The processing of Nato rice in this manner has been difficult in the past because the rice tends to stick together after cooking and again after drying. The present invention provides a new process which decreases sticking and clumping.

2. Background Art

Nato rice is attractive economically, but has found limited use in ready-to-eat cereals because of its inherent processing difficulties. The prior art has determined that the sticking and clumping of cooked, milled Nato rice can be decreased by employing glycerol monostearate, particularly as sold under the trademark Myvaplex. As available, the Myvaplex glycerol monostearate is a mixture with several other synthesized chemicals. The use of this processing aid, however, was not wholly advantageous from a nutritional standpoint. It was added for the sole purpose of improving the processability of the product and provided no nutritional value. Thus, it was inert in the food sense. Moreover, government regulations prevent calling a cereal product "natural" if it contains such synthesized chemical compounds. Accordingly, when it has been desired to produce natural-appearing products, such as disclosed in the U.S. Pat. No. 4,038,427, which could be legally called "natural", it has been the practice to avoid using Nato rice, regardless of the fact that an effective processing aid was known which was safe and food-approved.

DISCLOSURE OF INVENTION

In accordance with the present invention, we provide an improvement in a process for preparing a puffed product from rice by cooking milled rice in an aqueous flavoring solution, drying the resulting cooked rice to a moisture content effective for puffing, tempering the resulting dried rice to a degree effective to provide satisfactory puffing, and heating the rice under conditions effective to puff the rice, wherein the improvement comprises: prior to cooking the rice, admixing with it, dried torula yeast in the amount effective to reduce the tendency of the cooked rice to stick and clump. Alternatively cooked and extruded rice products can be similarly improved with torula yeast prior to puffing.

Thus, the present invention improves the known process for producing puffed Nato rice for use in cereal products by the use of a specially prepared torula yeast which decreases sticking and clumping after cooking and drying of the rice. The rice prepared in this manner can be used as a cereal product in the form produced, or can be combined with various cereal or food components to form pre-sweetened, agglomerated, fruit and cereal, or other ready-to-eat ceral products. As with prior art ready-to-eat cereal products of this type, they can be comsumed with milk, by themselves as snack products, or as ingredients in or garnishes in other food products.

In preparing the puffed products, milled Nato rice is mixed with spray-dried torula yeast which has been prepared by culturing on food grade ethanol. The spray-dried torula yeast is inactive by virtue of the conditions of spray-drying, but yet provides proper functionality for the purpose of decreasing sticking and clumping after cooking and drying. The torula yeast in its preferred form is a bland-tasting cream-colored powder. It will typically have a protein content of above approximately 45% and a fat content of no greater than about 9%. It is spray-dried to a moisture content of lower than 7% under conditions effective to provide a near-neutral to slightly-alkaline pH, preferably within the range of from about 7 to 8. Those spray-dried torula yeast products sold under the trademark "Torutein", and particularly those sold under the numerical designations 94, 50 and 10, have been found effective for use according to the present invention.

The spray-dried torula yeast can be employed according to the present invention in any amount effective to obtain a reduction in the degree of stocking and clumping of the milled Nato rice. The exact amount employed will be a function not only of the type of rice employed, but also of the ability of the processing equipment to handle a degree of sticking and clumping, as well as the functionality of a particular lot or grade of the torula yeast, as well as other variables which are beyond the scope of our present investigation. It has been found in practice, however, that a level of about 1% based on the weight of the rice will be effective under most conditions. It will be understood, however, that amounts less than this, say on the order of about 0.25%, and greater than this, say up to about 5% by weight can be employed so long as it is recognized that at the lower end of the range, less reduction in sticking and clumping will be obtained, and at the upper end of the range, there may be some minor flavor problems. It is fully within the contemplation of the present invention, however, to employ whatever level is effective for the intended purpose and which is not otherwise detrimental to the particular food product intended.

The spray-dried torula yeast is admixed with the milled Nato rice prior to cooking in the aqueous flavoring solution. The Nato rice is preferably what is known in the art as dehulled, polished Nato rice. In this form it is mixed dry with the spray-dried torula yeast for a period of time sufficient to uniformly distribute the smaller torula yeast particles among and around the larger rice grains. Typically, this is conducted in a conventional rotary pressure cooker prior to introduction of the aqueous flavoring solution thereto.

After adequate admixing of the Nato rice and the spray-dried torula yeast in the dry state, and aqueous flavoring syrup is added thereto in an amount effective to provide enough water for complete cooking of the rice as well as enough flavoring for the intended end use of the product. While it is possible to employ water alone, or water with salt, it is typical to employ various sugars such as sucrose, corn syrup solids, dextrose, and the like as well as flavoring materials such as malt extract and other cereal-compatable flavors. It is typical to employ a cooking syrup in an amount of from about 30% to about 50% based upon the weight of the rice wherein the syrup contains approximately 30% to 50% solids by weight.

After admixing the Nato rice and the spray-dried torula yeast with the aqueous flavoring solution, but prior to actually cooking the admixture, the admixture is preferably mixed in the rotary cooker for a period of up to about 15 to 30 minutes.

The cooking is preferably carried out in a conventional rotary pressure cooker which after addition of the ingredients, is sealed and heated for a time and under a steam pressure effective to fully cook the rice. Typically the rice will be cooked for a period of time of from about 30 to 60 minutes at a steam pressure of from about 10 to about 25 psig. According to preferred embodiment, the rice will be cooked for about 45 minutes at about 18 psig. During the entire period of cooking, the pressure cooker is rotated about its horizontal axis to provide good liquid-solid contact and to minimize sticking and clumping as would happen if the material remained stationary. After obtaining the desired degree of cook, the pressure cooker is depressurized and cooking air is admitted to at least partially cook and cooked Nato rice prior to unloading. According to the preferred embodiment, the rice is cooled during the unloading of the cooked rice from the rotating cooker with ambient air.

The resulting cooked Nato rice is then dried to a moisture content effective for puffing. Typically, the moisture content will be reduced to within the range of from about 12% to about 20% based upon the weight of the total cooked rice product. Drying can be accomplished by any suitable means. Typical of the equipment which can be employed are the well known cereal and macaroni dryers which find extensive use in the cereal art. The drying temperature will typically be sufficiently above 100° C. to obtain an adequate rate of drying. Typical drying temperatures will be within the range of from about 100° C. to about 110° C. As is known in the art, lower drying temperatures are not preferred because they require extensively long periods of time to obtain the proper moisture content, while higher drying temperatures are not preferred because they can cause uneven drying and caramelization which interfere with the puffing process.

After the drying, it is necessary to temper the rice for a period effective to substantially equalize the moisture content throughout the individual grains to improve its puffing characteristics. Typically, the tempering will take from about 3 to about 24, preferably from 4 to 6 hours. During tempering the rice can be maintained in mild agitation if, desired, however, this is not necessary.

Prior to puffing, the tempered Nato rice can be bumped by passing it between a pair of spaced rollers or other means suitable for flattening the rice into non-resillient pieces of diminished thickness. According to a preferred embodiment, the rice will be decreased to about 40% to about 75% of its original thickness. In this embodiment the rice will expand upon puffing into a gently cupped and puffed flake. If desired, it is possible to bump the rice to a greater degree to obtain a more-flattened, flake-like product.

After tempering and bumping if desired, the rice will be charged to a puffing device for forming the puffed flake. Typically a puffing oven can be employed where the Nato rice will be blasted with heated air at a temperature of from about 200° to about 250° C. at atmospheric conditions for a period from about 10 to about 120 seconds to product the desired puffed flake. Preferably the temperature within the puffing oven is sufficiently high to toast the rice simultaneously with puffing.

BEST MODE FOR CARRYING OUT THE INVENTION

The following example sets forth the best mode for carrying out the invention. This example is for the purpose of further describing and explaining the invention to those skilled in the art and is not meant to be limiting in any regard. Unless otherwise indicated, all parts and percentages given below are by weight.

EXAMPLE

To prepare a batch of cereal according to the process of the present invention, 634 kilograms of Nato rice and 6.5 kilograms of Torutein-94 (TM) spary-dried torula yeast is added to a rotary pressure cooker and admixed therein by rotating the cooker. After 5 minutes of mixing, 240 kilograms of an aqueous flavoring syrup solution containing about 50.3% water and about 40.7% solids is added to the cooker and mixed with the rice and spray-dried torula yeast for about 20 minutes prior to heating under pressure. The flavoring solution contains about 145 kilograms of aqueous sucrose containing 32.5% water, about 10 kilograms corn syrup containing about 19.5% water, and about 85 kilograms of salt brine containing about 73.5% water. At the end of 20 minutes of mixing, the cooker is heated under a pressure of 18 psig for 45 minutes with continued rotation. After this priod of time the cooker is exhausted to 0 psig. The cooled Nato rice is then cooled in the cooker, still under rotation, for 2 hours. The cooked and cooked Nato rice is then unloaded onto the wire mesh belt of a two-stage Proctor and Schwartz dryer. The drying air passing through both stages of the dryer is at a temperature of about 110° C. and reduces the moisture content of the cooked rice from the value of about 26% at the end of the cooking, to about 18% at the end of zone 1, and about 14% at the end of zone 2. Clumps are diminished by employing a pinbreaker within the dryer and employing a vibrating grading screen at the dryer discharge. The screen has about 41% net open area with opening sizes being 0.9×0.9 mm. The dried, cooked Nato rice is passed to a bin wherein it is tempered for about 1 to 6 hours and is then passed between bumping rolls spaced at a distance of about 50% of the thickness of an average grain and rotated at a speed of about 160 rpm. The bumbed Nato rice is then toasted in a conventional toasting oven operated at a temperature of about 240° C. for about 90 seconds to finally puff and toast the flake.

The above described puffed and toasted Nato rice flakes are desirably employed to prepare an agglomerated, natural cereal product. To accomplish this, the following dry fraction ingredients are weighed and added to a multi-flighted coating reel approximately 3 feet in diameter:

Rolled oats (8% moisture)—8 kilogram (kg)
Rolled wheat (8% moisture)—1.68 kg
Torula treated Nato rice flakes (2.5% moisture)—4.12 kg
Almonds, diced (4% moisture)—1.4 kg
Unsweetened, dried coconut (4% moisture)—1.31 kg
Non-fat Dry Milk (3% moisture)—1.04 kg The dry fraction ingredients are mixed in a coating reel which is operated at 30-60 rpm's for 5 minutes. Pure coconut oil (3.8 kilograms) at 43° C. is poured or sprayed onto the pre-blended dry fraction ingredients in the rotating reel, and the resulting oil-coated dry fraction is allowed to tumble in the reel for an additional five minutes at the same rpm to insure distribution of oil on the surface of the ingredients and impregnation thereof.

Spearately, a coating syrup having the following ingredients is prepared:
Brown sugar (granular, 2% moisture)—5.57 kg
Corn syrup (42 D.E. 80% solids)—0.54 kg
Honey solids—0.32 kg
Pure caramel power (1% moisture) 0.27 kg Water—2.6 kg The foregoing coating ingredients are dissolved in water at 65° C. and sprayed or poured at this temperature onto the oil-coated dry ingredients fraction in the rotating reel, the reel being operated at a range of 30-60 rpm's for an additional 5 minutes of tumbling so as to promote uniform coating of the material and particle aggregation.

The oil/syrup coated aggregates are then removed from the coating reel at a moisture content of 13% and dried. The dried agglomerates have a final moisture content of 1.5% to 3%. The material is broken apart while still in a warm, plastic state, cooled and sized by pressing through wire screen having ¾-inch openings. The sized, cooled agglomerate is then bulk-bagged for packaging.

The above description has been for the purpose of explaining the present invention of those of ordinary skill and is not intended to detail all those obvious modifications and variations of it which will become apparent upon reading. It is intended, however, to include all such obvious modifications and variations within the scope of the invention which is defined in the following claims.

What is claimed is:

1. An improvement in a process for preparing a puffed product from cooked and tempered Nato rice, heated under conditions effective to puff the rice, wherein the improvement comprises:
   prior to cooking the rice, admixing with it, an amount of dried torula yeast effective to reduce the tendency of the cooked rice to stick and clump.

2. A process according to claim 1 wherein the rice is bumped rolled after tempering, but prior to heating to puff.

3. A process according to claim 2 wherein the puffed rice is heated under conditions effective to toast it.

4. A process according to any one of claims 1, 2, or 3, wherein the dried torula yeast is employed at a level of from about 0.25 to about 5.0% based upon the dry weight of the rice and the yeast is a bland-tasting, cream-colored spray dried powder prepared from torula yeast cultured on ethanol.

5. A process according to claim 1 wherein the torula yeast is employed at level of about 1% based upon the dry weight of the Nato rice.

6. A process according to claim 1 wherein the rice is Nato rice and the dried torula yeast is spray dried and both are mixed dry for about five minutes prior to cooking.

7. A process according to claim 1 which further employs an aqueous flavoring solution comprises a solution containing sucrose, corn syrup, malt and salt.

8. The product of claim 1.

9. A cereal product containing the product of claim 1 and wherein dry torula yeast comprises from about 0.25% to about 5% of the dry weight of the rice and the yeast is a bland-tasting, cream-colored spray dried powder prepared from torula yeast cultured on ethanol.

* * * * *

UNITED STATES PATENT AND TRADEMARK OFFICE
CERTIFICATE OF CORRECTION

PATENT NO. : 4,238,514

DATED : December 9, 1980

INVENTOR(S) : Thom O. Martin et al.

It is certified that error appears in the above-identified patent and that said Letters Patent are hereby corrected as shown below:

In column 1, line 10, delete "the", second occurrence; line 66, change "ceral" to -- cereal -- .

In column 3, line 20, before "cooked" delete "cook and" and insert -- cool the -- ; line 54, after "decreased" change "to" to -- from -- ; line 66, change "product" to -- produce -- .

In column 4, line 29, change "cooled", first occurrence, to -- cooked -- ; line 30, before "Nato" delete "and cooked".

In column 5, line 5, change "Spearately" to -- Separately --; line 10, change "power" to -- powder --; delete "Water-"; line 11, before "2.6" insert -- Water- -- .

Signed and Sealed this

Twenty-second Day of December 1981

|SEAL|

Attest:

GERALD J. MOSSINGHOFF

Attesting Officer

Commissioner of Patents and Trademarks